United States Patent
Pitcher et al.

(10) Patent No.: US 9,238,966 B2
(45) Date of Patent: Jan. 19, 2016

(54) AZIMUTHAL BRITTLENESS LOGGING SYSTEMS AND METHODS

(75) Inventors: Jason L. Pitcher, The Woodlands, TX (US); Jennifer A. Market, Rosehill, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 51 days.

(21) Appl. No.: 14/118,776

(22) PCT Filed: May 31, 2011

(86) PCT No.: PCT/US2011/038538
§ 371 (c)(1),
(2), (4) Date: Nov. 19, 2013

(87) PCT Pub. No.: WO2012/166111
PCT Pub. Date: Dec. 6, 2012

(65) Prior Publication Data
US 2014/0090891 A1 Apr. 3, 2014

(51) Int. Cl.
*E21B 49/00* (2006.01)
*G01V 1/42* (2006.01)

(52) U.S. Cl.
CPC .............. *E21B 49/006* (2013.01); *G01V 1/42* (2013.01)

(58) Field of Classification Search
CPC .......... E21B 49/006; G01V 1/42; G01V 1/48; G01V 99/00; G01V 2210/647; G01V 44/00; G01V 47/00
USPC ............................................. 175/50; 367/25
See application file for complete search history.

(56) References Cited

U.S. PATENT DOCUMENTS

| 4,832,148 | A | 5/1989 | Becker et al. |
| 5,386,875 | A | 2/1995 | Venditto et al. |
| 5,847,283 | A | 12/1998 | Finot et al. |
| 5,987,385 | A | 11/1999 | Varsamis et al. |
| 6,568,486 | B1 | 5/2003 | Wallace |
| 6,614,360 | B1 | 9/2003 | Leggett, III et al. |
| 6,714,480 | B2 | 3/2004 | Sinha et al. |
| 7,472,022 | B2 * | 12/2008 | Birchwood ............. E21B 44/00 700/159 |

(Continued)

FOREIGN PATENT DOCUMENTS

WO WO-2012/166111 12/2012

OTHER PUBLICATIONS

PCT International Search Report and Written Opinion, dated Sep. 21, 2011, Appl No. PCT/US2011/038538, "Azimuthal Brittleness Logging Systems and Methods", filed May 31, 2011, 9 pgs.
Rickman, Rick et al., "A Practical Use of Shale Petrophysics for Stimulation Design Optimization: All Shade Plays Are Not Clones of the Barnett Shale.", SPE Annual Technical Conference and Exhibition, Denver, Colorado, Sep. 21-24, 2008, 11 pgs.

(Continued)

*Primary Examiner* — Daniel L Murphy
(74) *Attorney, Agent, or Firm* — Krueger Iselin LLP; Benjamin Fite

(57) ABSTRACT

Methods and systems for gathering, deriving, and displaying the azimuthal brittleness index of a borehole. At least some embodiments include various methods for calculating and displaying borehole measurements in real-time for geosteering and drilling operations. At least one disclosed method embodiment for calculating and displaying azimuthal brittleness includes taking measurements of compressional and shear wave velocities as a function of position and orientation from inside the borehole. These velocity measurements are taken by a azimuthal sonic tool. Azimuthal brittleness is then derived based at least in part on the compressional and shear wave velocities.

19 Claims, 4 Drawing Sheets

(56) References Cited

U.S. PATENT DOCUMENTS

| | | | |
|---|---|---|---|
| 7,526,385 B2* | 4/2009 | Sayers | G01V 1/50 702/13 |
| 2004/0220742 A1 | 11/2004 | Mese et al. | |
| 2005/0078555 A1 | 4/2005 | Tang et al. | |
| 2010/0017136 A1 | 1/2010 | Birchwood et al. | |
| 2010/0238764 A1 | 9/2010 | Pistre et al. | |
| 2010/0250214 A1* | 9/2010 | Prioul | G01V 1/48 703/10 |
| 2011/0015907 A1* | 1/2011 | Crawford | G01V 99/00 703/2 |
| 2011/0019501 A1 | 1/2011 | Market | |
| 2011/0042080 A1 | 2/2011 | Birchwood et al. | |

OTHER PUBLICATIONS

PCT International Preliminary Examining Authority, dated May 23, 2013, Appl No. PCT/US2011/038538, "Azimuthal Brittleness Logging Systems and Methods", filed May 31, 2011, 8 pgs.

Mullen, Mike et al., "A Composite Determination of Mechanical Rock Properties for Stimulation Design (What to Do When You Don't Have a Sonic Log)", SPE 108139, Rocky Mountain Oil & Gas Technology Symposium, Apr. 16-18, 2007, 13 pgs., Denver, Colorado, U.S.A.

PCT International Preliminary Report on Patentability, dated May 23, 2013, Appl No. PCT/US2011/038538, "Azimuthal Brittleness Logging Systems and Methods", filed May 31, 2011, 11 pgs.

* cited by examiner

AZIMUTHAL BRITTLENESS LOGGING SYSTEMS AND METHODS

BACKGROUND

It is useful to know certain characteristics of a borehole for drilling operations. In order to gather information about the borehole, drillers often use a wireline or logging while drilling (LWD) tool that can retrieve data and produce logs or even images representing the characteristics of the formations penetrated by the borehole. An example of one such tool is a sonic logging tool, which operates by generating sonic pulses and measuring the time it takes for such pulses to propagate along the borehole. With such measurements, drillers are able to measure a variety of geological characteristics including formation density and porosity.

One of the properties that drillers may find important is sonic measure of formation brittleness. Moderately brittle formations may be expected to be easily fractured and hence more permeable to fluid flows. Ideally, the driller would like to position the borehole in a region where such permeability provides access to a reservoir of hydrocarbons. Highly brittle formations, on the other hand, may be expected to be unstable and prone to borehole cave-ins and collapse, a situation which could cause economic and environmental losses and even necessitate abandonment of the well. There do not appear to be any logging systems and methods available for providing drillers with suitable azimuthal formation brittleness measurements during the drilling process.

BRIEF DESCRIPTION OF THE DRAWINGS

A better understanding of the various disclosed embodiments can be obtained when the following detailed description is considered in conjunction with the following drawings, in which.

DETAILED DESCRIPTION

The issues identified in the background are at least in part addressed by the disclosed methods and systems for gathering, deriving, and displaying the azimuthal brittleness index of a borehole. At least some embodiments include various methods for calculating and displaying borehole measurements in real-time for geosteering and drilling operations. At least one disclosed method embodiment for calculating and displaying azimuthal brittleness includes taking measurements of compressional and shear wave velocities as a function of position and orientation from inside the borehole. These velocity measurements are taken by a sonic tool. Azimuthal brittleness is then derived based at least in part on the compressional and shear wave velocities, and is displayed to the driller who can then adjust the drilling direction based on the azimuthal brittleness information. A logging system to implement the above stated methods includes an azimuthal sonic tool and a processor that retrieves measurements from the sonic tool to generate a brittleness image log and, in a geosteering application, to optionally guide the drillstring based at least in part on the brittleness image log.

Figure 1:
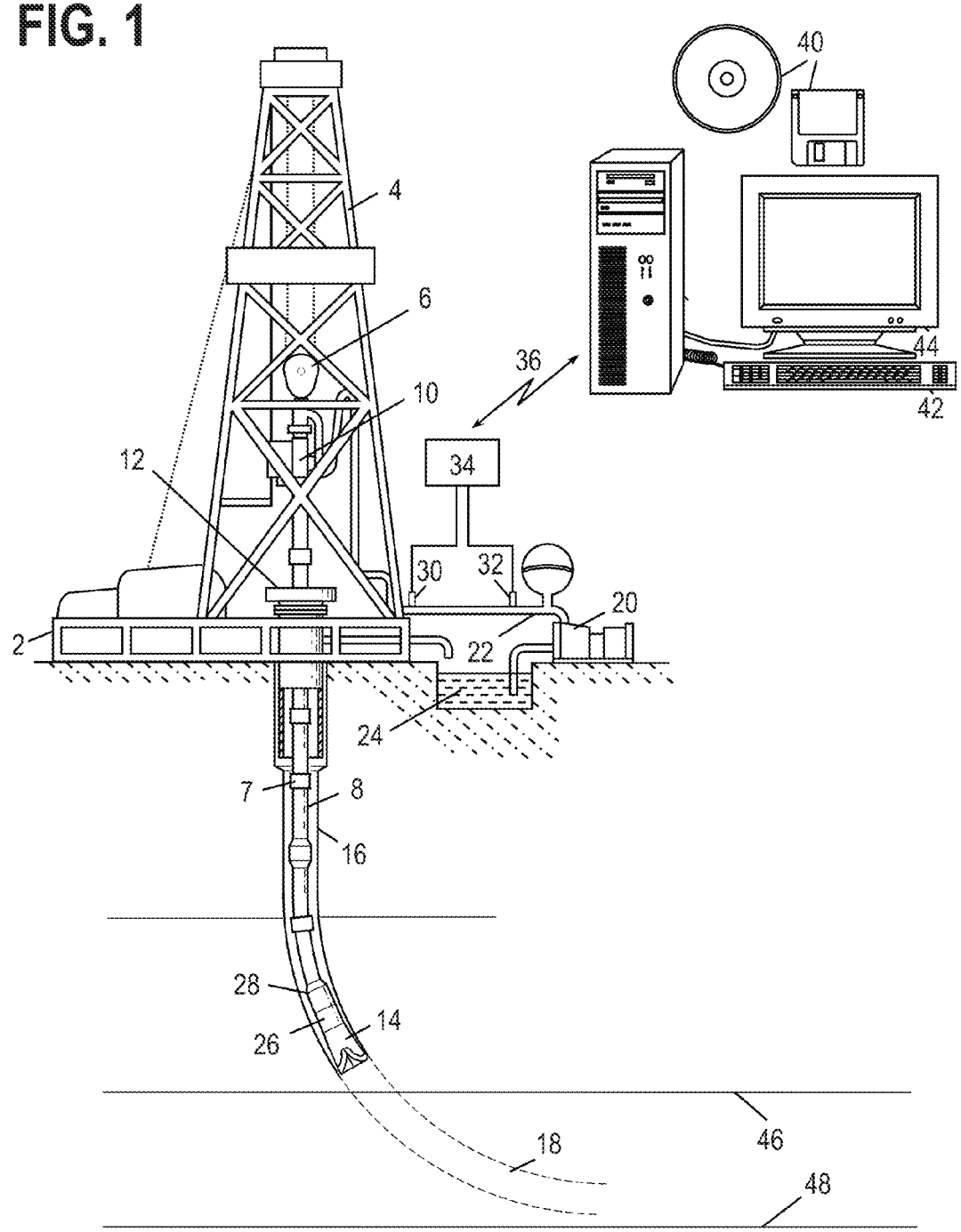
FIG. 1 shows an illustrative drilling environment where geosteering is employed.

To further assist the reader's understanding of the disclosed systems and methods, we describe an environment suitable for their use and operation. An illustrative geosteering environment is shown in FIG. 1A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. The drill bit 14 is just one piece of a bottom-hole assembly that typically includes one or more drill collars (thick-walled steel pipe) to provide weight and rigidity to aid the drilling process. Some of these drill collars may include logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. The system further includes a tool 26 to gather measurements of formation properties from which formation boundaries can be identified as discussed further below. Using these measurements in combination with the tool orientation measurements, the driller can steer the drill bit 14 along a desired path 18 using any one of various suitable directional drilling systems, including steering vanes, a "bent sub", and a rotary steerable system. A pump 20 circulates drilling fluid through a feed pipe 22 to top drive 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity. Moreover, a telemetry sub 28 coupled to the downhole tools 26 can transmit telemetry data to the surface via mud pulse telemetry. A transmitter in the telemetry sub 28 modulates a resistance to drilling fluid flow to generate pressure pulses that propagate along the fluid stream at the speed of sound to the surface. One or more pressure transducers 30, 32 convert the pressure signal into electrical signal(s) for a signal digitizer 34. Note that other forms of telemetry exist and may be used to communicate signals from downhole to the digitizer. Such telemetry may employ acoustic telemetry, electromagnetic telemetry, or telemetry via wired drillpipe.

The digitizer 34 supplies a digital form of the pressure signals via a communications link 36 to a computer 38 or some other form of a data processing device. Computer 38 operates in accordance with software (which may be stored on information storage media 40) and user input via an input device 42 to process and decode the received signals. The resulting telemetry data may be further analyzed and processed by computer 38 to generate a display of useful information on a computer monitor 44 or some other form of a display device. For example, a driller could employ this system to obtain and monitor drilling parameters, formation properties including an azimuthal brittleness log, and the path of the borehole relative to detected formation boundaries 46 and 48.

Figure 2:
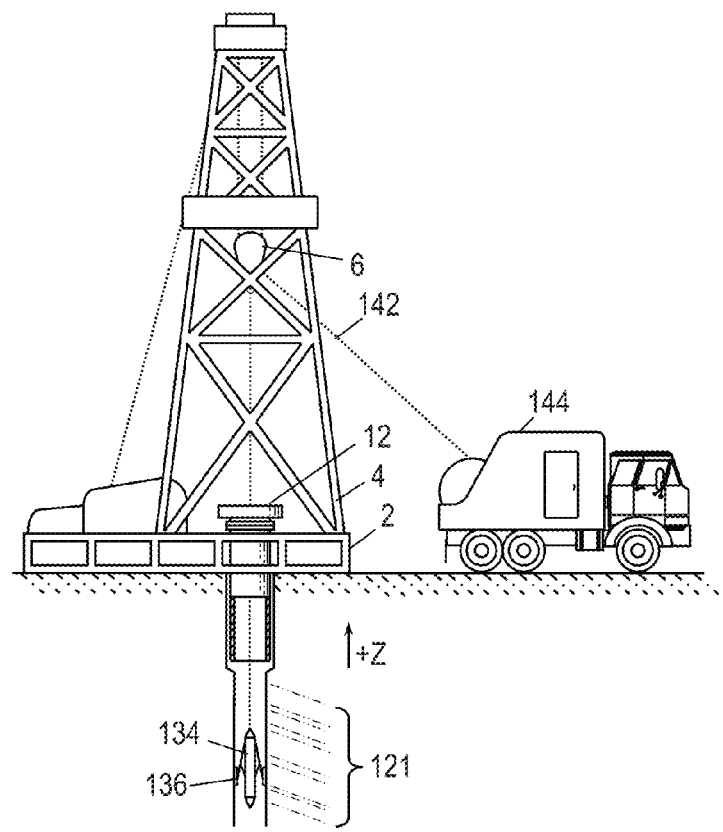
FIG. 2 shows an illustrative wireline drilling environment.

FIG. 2 shows an illustrative wireline logging environment. At various times during the drilling process, the drill string 8 is removed from the borehole to allow the use of a wireline logging tool 134. The wireline logging tool is a sensing instrument sonde suspended by a cable 142 having conductors for transporting power to the tool and telemetry from the tool to the surface. The wireline logging tool 134 may have arms 136 that center the tool within the borehole or, if desired, press the tool against the borehole wall. The borehole penetrates various formations 121. A logging facility 144 collects measurements from the logging tool 134, and includes computing facilities for processing and storing the measurements gathered by the logging tool.

Figure 3:
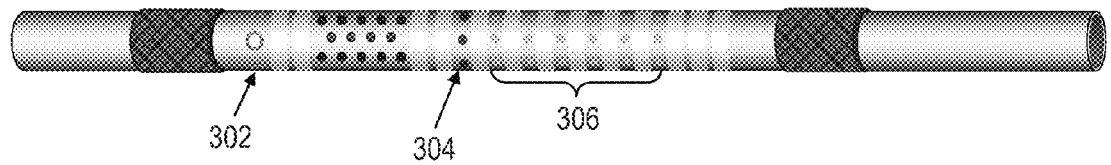
FIG. 3 is an illustrative sonic logging tool.

FIG. 3 shows an illustrative sonic logging tool for use in a logging while drilling environment. Similar tool configurations are available for use in a wireline logging environment. The logging shown has 4 azimuthal transmitters 302 that can be operated as a monopole, dipole, crossed-dipole, or quadrupole source. The logging tool also has acoustic callipers 304, and azimuthally-sensitive receiver arrays 306. The acoustic callipers 304 are aligned with the receiver arrays 306 for accurate measurement of hole shape, and toot position. As the logging tool rotates within the borehole, it gathers information by measuring compressional and shear wave velocities. Each of the transmitters 302 are capable of firing a positive or negative wave and operating cooperatively to create sound waves that propagate in monopole, dipole, quadrupole, and crossed-dipole modes. The illustrated tool has four azimuthally spaced arrays of receivers 306, with 6 receivers in each array. Each array has its closest receiver located 5 ft from the transmitter, with 6 inches between each successive receiver. Each receiver is sensitive across a broad range of frequencies and is isolated from the collar in a manner to eliminate bit noise and mud circulation noise. A processor collects measurements from each receiver's response to the transmitter firings to measure the propagation speeds of the various wave modes and to extract azimuthally-sensitive measurements of the compressional and shear wave propagation velocities.

When analyzing sonic data, accurate knowledge of the borehole size and shape as well as the position of the tool in the borehole can be used to increase measurement accuracy and sharpen the resolution of the azimuthal image. In the wireline environment, multi-arm mechanical callipers are usually run in conjunction with the sonic tool to acquire this information, whereas the illustrated tool employs four ultrasonic callipers (one aligned with each receiver array). Every time sonic data is collected, the four ultrasonic callipers make a near-simultaneous measurement of distances to the borehole wall. The four calliper measurements can be used to determine hole size and the position of the tool in the borehole. The tool can be programmed to acquire image data in 1-, 2-, 4-, 8-, or 16-sector resolution, or even higher if desired. In practice, data is often acquired with 16 sector azimuthal resolution.

For each sector around the borehole, at a given depth, measurements of the compressional and shear wave velocities are taken. From these raw measurements, Young's Modulus and Poisson's Ratio can be derived, given a reasonable estimate of density either from another logging tool or offset well log. Alternatively, a density estimate can be derived from the sonic logging tool measurements in accordance with the methods disclosed in co-pending U.S. patent application Ser. No. 13/003,609, "Systems and Methods for Acoustically Measuring Bulk Density", filed Jan. 11, 2011, by M. Oraby. Poisson's Ratio can be expressed in terms of compressional wave velocity ($V_P$) and shear wave velocity ($V_S$) as follows:

$$v = \frac{0.5(V_P/V_S)^2 - 1}{(V_P - V_S)^2 - 1}. \tag{1}$$

The Young's modulus can then be calculated based on density ($\rho$), Poisson's Ratio (v), and shear wave velocity ($V_S$):

$$E = \rho V_S^2 (1+v)^2 \tag{2}$$

Due to the azimuthal dependence of the compressional and shear wave velocity measurements (and possibly the density measurements as well), the values of Poisson's Ratio and Young's modulus can be derived as a function of borehole position and azimuth to provide image logs of these values. These image logs can then be combined in accordance with the teachings of Rickman, et. al. "A Practical Use of Shale Petrophysics for Stimulation Design Optimization: All Shale Plays Are Not Clones of the Barnett Shale" [SPE 115258] (2008) to derive a brittleness index for each sector. Various brittleness measures can be employed, including a brittleness index expressible as $$BI = (c_1 E + c_2 v)/2, \tag{3}$$

where $c_1$ and $c_2$ are coefficients that equalize the significance of each factor as a brittleness indicator.

Figure 4:
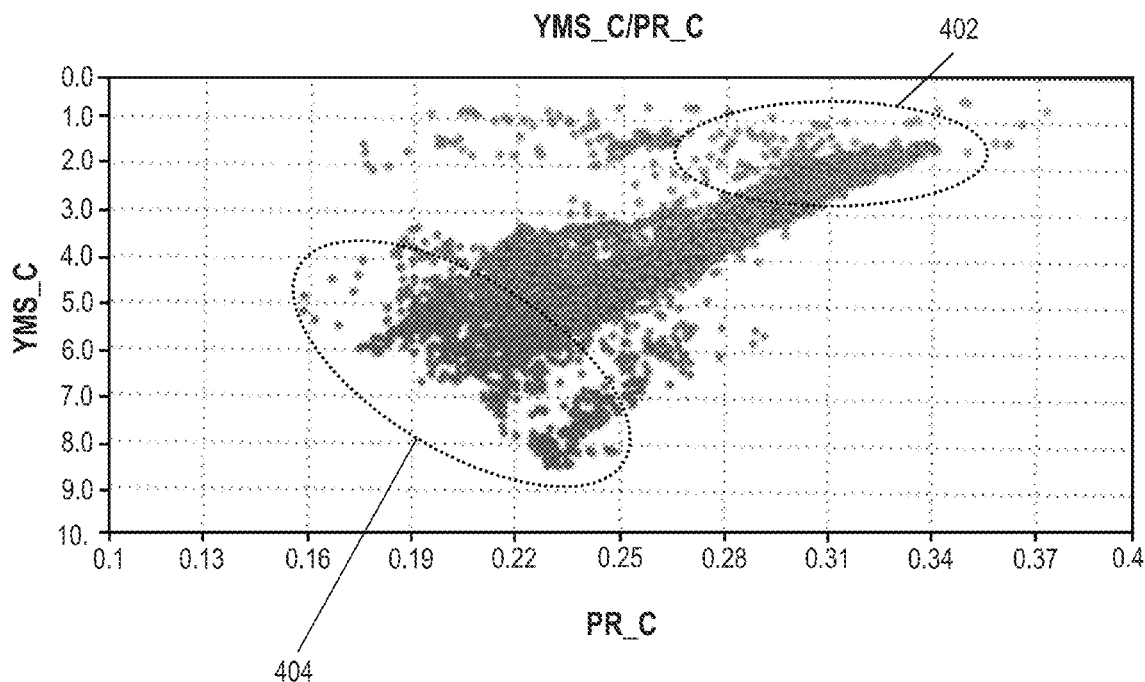
FIG. 4 shows an illustrative cross plot of Young's Modulus and Poisson's Ratio for a borehole.

FIG. 4 shows an illustrative cross plot of Young's Modulus and Poisson's Ratio as determined from the sonic logs of a test well. The less brittle area 402 and the more brittle area 404 of the borehole are both shown in this Figure. The Young's Modulus and Poisson's Ratio components are combined to reflect the rocks ability to fail under stress and maintain a fracture once the rock fractures. Ductile shale (which would occur in area 402) is not a good formation for accessing a reservoir because the formation will tend to heal any natural or hydraulic fractures. Ductile shale however, makes a good seal, trapping the hydrocarbons from migrating out of the more brittle shale below. Brittle shale (which would occur near area 404) is more likely to be naturally fractured and will also be more likely to respond well to hydraulic fracturing treatments. Thus, it is desirable to quantify the brittleness factor in a way that combines both rock mechanical properties in shale. FIG. 4 is a graphical representation of this concept. In terms of Poisson's Ratio, the lower the value, the more brittle the rock, and as values of Young's Modulus increase, the more brittle the rock will be. Because the units of Poisson's Ratio and Young's Modulus are very different, the brittleness caused by each component is unitized, and then averaged to yield the brittleness coefficient as a percentage.

Figure 5:
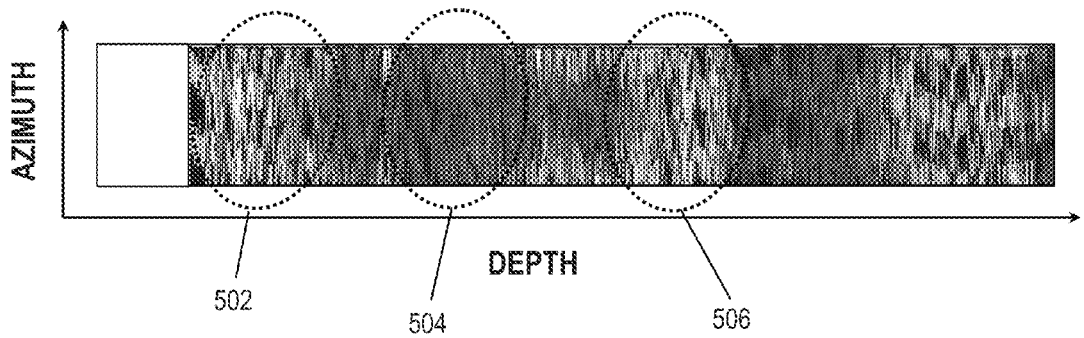
FIG. 5 is an illustrative borehole image for azimuthal brittleness index.

FIG. 5 shows an illustrative image log representation of azimuthal brittleness index that can be calculated and displayed during drilling operations. An image log of brittleness index can be useful during geosteering. This technology takes advantage of the fact that LWD tools rotate while acquiring data to create sonic velocity images around the borehole. Along the horizontal axis, the log shows the dependence of the brittleness index on the tool's depth or position in the borehole. Along the vertical axis, the log shows the dependence of the brittleness index on the azimuth or rotational angle of the tool. Usually, the upper and lower edges of the log represent the high side of the borehole, while the middle represents the low side. It can be observed that the log reveals changes to the brittleness index of the formations penetrated by the borehole, enabling the driller to identify desirable formations and steer the borehole to maximize exposure to such formations.

For example, assume that the driller regards the formation represented by area 502 as having a desirable brittleness index. As the drilling assembly encounters an adjacent formation having a less desirable brittleness index (as represented by area 504), the driller takes corrective action and steers the borehole back to the desirable formation (represented again by area 506). Perhaps due to an overcorrection, the borehole passes entirely through the desirable formation and further steering corrections are required. The information revealed by the brittleness image log can assist the driller in geosteering the borehole into a economically desirable formation. These images can also be used as traditional wireline crossed-dipole data are used (for stress analysis, fracture characterization, and 3-dimensional rock mechanics) as well as to provide additional services such as geosteering.

In addition to formation permeability, borehole stability issues are also a concern during drilling operations. For example, certain areas of the borehole may be too brittle for drilling. If an extremely brittle area is drilled, then the entire borehole is likely to collapse creating a catastrophic loss in materials and resources. On the other hand, a brittle area of the borehole can also represent a more permeable area of the borehole. More gas is likely to flow through more permeable areas of the borehole. Thus, a trade-off exists, and it is desirable for the driller to quickly be aware of the brittle index of a borehole while conducting drilling operations.

Figure 6:
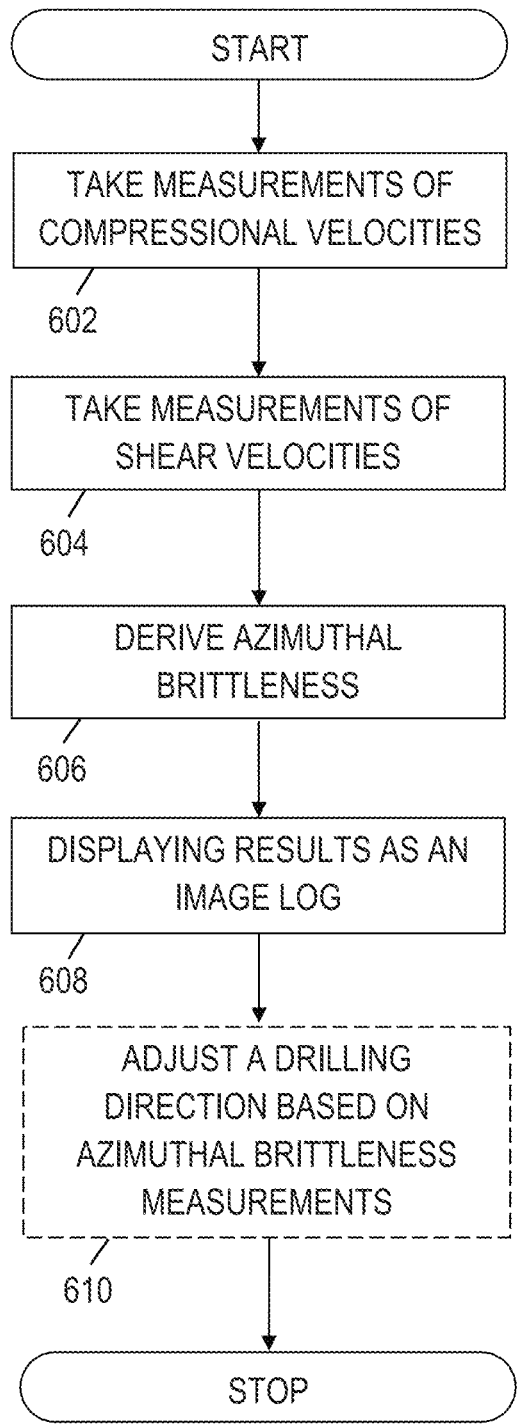
FIG. 6 is an illustrative flow diagram for computing and displaying azimuthal brittleness.

FIG. 6 shows an illustrative method for calculating and displaying azimuthal brittleness. In blocks 602 and 604, a sonic logging tool acquires measurements for both compressional and shear velocities in the borehole. In block 606 a surface processing system calculates azimuthal brittleness and associates it with the position and orientation of the sonic logging tool to form an azimuthal brittleness image log. In block 608, the surface processing system displays the log to an engineer, for use in analyzing borehole stability and determining a suitable hydraulic fracturing procedure. Optionally, the log may be acquired during the drilling process and displayed in real time to the driller. In block 610, the driller adjusts the drilling direction based on the azimuthal brittleness logs.

Different embodiments for methods and systems to determine azimuthal brittleness and optionally employ it as a guide during drilling operations are presented. A method embodiment for calculating and displaying azimuthal brittleness includes taking measurements of compressional and shear wave velocities as a function of position and orientation from inside the borehole. Azimuthal brittleness is then derived at least in part from these velocities.

Another method embodiment for performing a geosteering operation includes determining azimuthal brittleness of a borehole, and automatically adjusting a drilling direction based at least in part on the determination of azimuthal brittleness. A logging system to implement the above stated methods includes an azimuthal sonic tool and a processor that retrieves measurements from the sonic tool. The system can also include a geosteering assembly, and be used during both wireline and LWD operations.

It is contemplated that the azimuthal brittleness logs could be used to direct perforation guns and stimulation jets for increased penetration. These and other variations and modifications will become apparent to those skilled in the art once the above disclosure is fully appreciated. It is intended that the following claims be interpreted to embrace all such variations and modifications.

What is claimed is:

1. A brittleness logging method that comprises:
   taking measurements of compressional wave velocity as a function of position and orientation from inside a borehole;
   taking measurements of shear wave velocity as a function of position and orientation from inside said borehole;
   deriving azimuthal brittleness at least in part from said compressional and shear wave velocities; and
   displaying azimuthal brittleness as an image log.

2. The method of claim 1, further comprising using said azimuthal brittleness for guidance during geosteering.

3. The method of claim 1, wherein said deriving includes determining an azimuthally-dependent Poisson's ratio value.

4. The method of claim 3, wherein said deriving further includes determining an azimuthally-dependent Young's modulus value.

5. The method of claim 4, wherein said deriving includes a weighted averaging of said Young's modulus value with the Poisson's ratio value.

6. The method of claim 1, wherein said measurements are acquired by a wireline acoustic logging tool.

7. A geosteering method that comprises:
   determining azimuthal brittleness of a borehole; and
   adjusting a drilling direction based at least in part on said determination.

8. The method of claim 7, wherein said determining azimuthal brittleness includes obtaining measurements of compressional and shear wave velocities from said borehole.

9. The method of claim 7, further comprising displaying azimuthal brittleness as an image log from said borehole.

10. The method of claim 7, wherein said adjusting a drilling direction includes providing a display of azimuthal brittleness image log to a driller.

11. The method of claim 7, wherein said adjusting a drilling direction is performed automatically based at least in part on said azimuthal measurements.

12. The method of claim 7, wherein said deriving includes determining an azimuthally-dependent Poisson's ratio value.

13. The method of claim 12, wherein said deriving further includes determining an azimuthally-dependent Young's modulus value.

14. A logging system that comprises:
   an azimuthal sonic tool; and
   a processor that determines an azimuthal brittleness log based at least in part on measurements retrieved from said sonic tool.

15. The system of claim 14, wherein said system further comprises a geosteering assembly.

16. The system of claim 14, wherein said azimuthal sonic tool is used during wireline logging.

17. The system of claim 14, wherein said azimuthal sonic tool is used during logging while driling (LWD).

18. The system of claim 14, wherein as part of determining the azimuthal brittleness, the processor derives an azimuthally-dependent Poisson's ratio value.

19. The system of claim 18, wherein as part of determining the azimuthal brittleness, the processor derives an azimuthally-dependent Young's modulus value.

* * * * *